US009671106B2

(12) United States Patent
Price et al.

(10) Patent No.: US 9,671,106 B2
(45) Date of Patent: Jun. 6, 2017

(54) STEAM GENERATOR AND METHOD FOR GENERATING STEAM (71) Applicant: FCCL PARTNERSHIP, Calgary (CA)

(72) Inventors: Glenn Robert Price, Calgary (CA); Susan Wei Sun, Calgary (CA); Michael John Wasylyk, Bonnyville (CA)

(73) Assignee: FCCL PARTNERSHIP, Calgary, AB (CA)

(*) Notice: Subject to any disclaimer, the term of this patent is extended or adjusted under 35 U.S.C. 154(b) by 0 days.

(21) Appl. No.: 14/875,271

(22) Filed: Oct. 5, 2015

(65) Prior Publication Data
US 2016/0025330 A1 Jan. 28, 2016

Related U.S. Application Data (63) Continuation of application No. 13/722,881, filed on Dec. 20, 2012, now Pat. No. 9,182,114.
(Continued)

(51) Int. Cl.
F22B 35/10 (2006.01)
E21B 43/24 (2006.01)
(Continued)

(52) U.S. Cl.
CPC ........ F22B 35/102 (2013.01); E21B 43/2406 (2013.01); F22B 29/061 (2013.01);
(Continued)

(58) Field of Classification Search
CPC ...... E21B 43/24; E21B 43/2406; C02F 1/048; C02F 2303/22; F22B 37/26; F22B 37/10;
(Continued)

(56) References Cited

U.S. PATENT DOCUMENTS 4,271,792 A   6/1981   Wittchow
4,727,826 A   3/1988   Draper et al.
(Continued)

FOREIGN PATENT DOCUMENTS

CA    2549614 A1    12/2007
CA    2641866 A1    4/2009
WO    2013050075 A1   4/2013

OTHER PUBLICATIONS

Babcock & Wilcox Company, Steam, its generation and use. Babcock & Wilcox., 1913 pp. 5-5 to 5-7.

Primary Examiner — Gregory A Wilson
(74) Attorney, Agent, or Firm — Smart & Biggar (57) ABSTRACT A steam generator apparatus for generating steam from a feedwater inlet stream including impurities is disclosed. The apparatus includes a tubing circuit in communication with an inlet for receiving the feedwater stream, the tubing circuit having a substantially unrifled bore defined by a metal wall, and a heat source operable to deliver a heat flux to the feedwater stream through the metal wall of the tubing circuit, the heat flux being operable to cause evaporation of feedwater within the tubing circuit and to produce an outlet stream at an outlet of the tubing circuit, the outlet stream includes a steam portion and liquid phase portion, the steam portion being greater than about 80% of the outlet stream by mass, the steam portion providing sufficient cooling of the metal wall to maintain a wall temperature at less than a threshold temperature associated with safe operation of the steam generator apparatus.

15 Claims, 5 Drawing Sheets

Related U.S. Application Data (60) Provisional application No. 61/578,940, filed on Dec. 22, 2011.

(51) Int. Cl.

| | | |
|---|---|---|
| *F22B 29/06* | (2006.01) | |
| *F22B 37/10* | (2006.01) | |
| *F22B 37/50* | (2006.01) | |
| *F22D 1/02* | (2006.01) | |
| *F22D 5/26* | (2006.01) | |
| *F22B 37/48* | (2006.01) | |

(52) U.S. Cl.
CPC ............ *F22B 29/067* (2013.01); *F22B 37/10* (2013.01); *F22B 37/48* (2013.01); *F22B 37/50* (2013.01); *F22D 1/02* (2013.01); *F22D 5/26* (2013.01); *C02F 2303/22* (2013.01)

(58) Field of Classification Search
CPC .. F22B 37/50; F22B 35/10; F22D 1/02; F22D 5/26; F22D 11/00
USPC ........ 122/412, 414, 406.1, 406.4, 428, 451 R
See application file for complete search history.

(56) References Cited

U.S. PATENT DOCUMENTS

| | | | |
|---|---|---|---|
| 4,759,314 A * | 7/1988 | Banweg | F22B 35/108 122/406.4 |
| 5,249,551 A | 10/1993 | Kirkpatrick | |
| 5,419,285 A * | 5/1995 | Gurevich | F22D 1/04 122/406.1 |
| 6,013,158 A | 1/2000 | Wootten | |
| 8,166,925 B2 * | 5/2012 | Suggett | F22B 29/06 122/406.4 |
| 8,631,871 B2 * | 1/2014 | Berruti | E21B 36/025 122/406.4 |
| 9,303,866 B2 * | 4/2016 | Davis | F22B 37/02 |
| 9,310,070 B2 * | 4/2016 | Davis | F22B 37/02 |
| 2009/0133643 A1 * | 5/2009 | Suggett | F22B 29/06 122/1 B |
| 2011/0017449 A1 | 1/2011 | Berruti | |
| 2011/0061867 A1 | 3/2011 | Bjorklund et al. | |
| 2013/0161009 A1 | 6/2013 | Price et al. | |
| 2014/0083694 A1 * | 3/2014 | Scott | F22B 37/26 166/272.3 |
| 2014/0110109 A1 * | 4/2014 | Latimer | F22B 1/18 166/267 |
| 2014/0246196 A1 * | 9/2014 | Larkin | F22B 1/22 166/272.3 |
| 2014/0262257 A1 * | 9/2014 | Costanzo | F22D 1/02 166/272.3 |

* cited by examiner

| | No Scale | 1 mm Scale | 3.4 mm Scale | |
|---|---|---|---|---|
| Gas velocity | 17.54 | 18.53 | 21.28 | m/s |
| Tube wall thermal conductivity | 44.4 | 43.7 | 41.8 | W/m-K |
| Heat Transfer Coefficient, $h_i$ (internal convection) | 11,291 | 11,994 | 13,965 | W/m$^2$-K |
| $R_f$ | 1.07E-04 | 1.03E-04 | 9.52E-05 | 1/(W/m$^2$-K) |
| $R_s$ | 0.00E+00 | 2.22E-04 | 7.83E-04 | 1/(W/m$^2$-K) |
| $R_w$ | 1.88E-04 | 1.91E-04 | 2.00E-04 | 1/(W/m$^2$-K) |
| Bulk fluid (steam) temp. | 311 | 311 | 311 | °C |
| $T_{si}$ | 323 | 322 | 321 | °C |
| $T_{wi}$ | 323 | 346 | 405 | °C |
| $T_{wo}$ | 344 | 367 | 427 | C |
| Allowable stress | 118 | 109 | 74 | MPa |
| Calculated max. stress | 53.8 | 53.8 | 53.8 | MPa |

STEAM GENERATOR AND METHOD FOR GENERATING STEAM

BACKGROUND OF THE INVENTION

1. Field of Invention

This invention relates generally to generation of steam and more particularly to generation of steam from a feedwater inlet stream including impurities.

2. Description of Related Art

Steam is generated for use in many industrial processes. The generated steam may be used to perform mechanical work, for heating and temporary energy storage, and for generating electricity. In hydrocarbon recovery operations steam is additionally used for extracting heavy oil through cyclic steam stimulation, steam flooding, or steam-assisted gravity drainage (SAGD), for example. The cost of steam generation and the associated generation of emissions is a major consideration in assessing economic potential of hydrocarbon recovery operations.

In SAGD operations steam is generated from a feedwater stream which may include groundwater, surface water, and fresh water. Water produced from the SAGD well is commonly treated and at least a portion is recycled for use in the steam generation. Heat for operating steam generators may be provided by natural gas, synthetic gas generated by gasification of heavy fractions of produced bitumen, coal, or a nuclear reactor, for example.

SAGD operations generally require injection of dry steam having a steam quality of substantially 100%, because any liquid content injected into the steam chamber essentially drains to the production borehole and requires removal and recycling. This adds to the water recycling costs without contributing to heat delivery or hydrocarbon recovery within the well. The steam quality is expressed as a percentage of the mass of the stream that is in the vapor state, with dry steam having a quality of 100%. Steam generation generally follows a two-stage process in which steam is generated at a quality of less than 80% followed by a subsequent processing through a steam separator that produces a stream of substantially dry 100% quality vapor and a liquid stream, which is typically treated and recycled.

US patent application 2011/0017449 by Berruti discloses a steam generator having a steam-generating circuit having a heating segment defining a heating portion of the steam generator. The steam-generating circuit includes a pipe that receives feedwater at an inlet end and is subjected to heat to convert the feedwater into steam and water. The pipe has a bore at least partially defined by an inner surface having ribs defining a helical flow passage, which guides and imparts a swirling motion to the water to control concentrations of the impurities in the water. Berruti discloses that rifled pipes offer the ability to operate at higher steam quality without significantly increasing the surface impurity concentration level, thus reducing the likelihood of over-saturating the impurity components in which case scale may form. Berruti also discloses that wetted wall conditions result in more efficient heat transfer and the heat transfer coefficient of the steam flow is considerably higher in wetted wall versus dry conditions.

SUMMARY OF THE INVENTION

In accordance with one aspect of the invention there is provided a method for generating steam from a feedwater inlet stream including impurities. The method involves receiving the feedwater inlet stream at an inlet of a steam generator and causing the feedwater stream to flow through a tubing circuit to an outlet of the tubing circuit, the tubing circuit having a substantially un-rifled bore defined by a metal wall. The method also involves delivering a heat flux to the feedwater stream through the metal wall of the tubing circuit to generate steam by causing evaporation of feedwater within the tubing circuit, and controlling at least one of a flow rate of the feedwater stream and the heat flux to cause generation of an outlet stream at the outlet includes a steam portion and liquid phase portion, the steam portion being greater than about 80% of the outlet stream by mass. The steam portion provides sufficient cooling of the metal wall to maintain a wall temperature at less than a threshold temperature.

The threshold temperature may include one of a temperature above which carbonization of the metal wall of the tubing circuit may be likely to occur, and a temperature above which resistance of the tubing circuit to stresses induced by the operating conditions does not meet a criterion for safe operation.

The method may involve causing a substantial portion of the impurities present in the feedwater inlet stream to be entrained in the liquid phase portion of the outlet stream and discharged as part of the outlet stream thereby reducing scaling of the bore of the tubing circuit.

Controlling may involve controlling at least one of a flow rate of the feedwater stream and the heat flux to cause generation of the outlet stream such that impurities that precipitate out of the feedwater stream and accumulate on the bore may be insufficient to cause an increase in temperature of the wall of the tubing circuit to above the threshold temperature.

Controlling may involve controlling at least one of a flow rate of the feedwater stream and the heat flux to cause generation of an outlet stream including a steam portion of greater than about 90% of the outlet stream by mass.

Controlling may involve controlling at least one of a flow rate of the feedwater stream and the heat flux to cause generation of an outlet stream may involve a steam portion of about 92% of the outlet stream by mass.

Controlling may involve controlling at least one of a flow rate of the feedwater stream and the heat flux to cause generation of an outlet stream including a steam portion of greater than about 95% of the outlet stream by mass.

Receiving the feedwater inlet stream may involve receiving a feedwater inlet stream having a pH of less than 9 and may further involve conditioning the feedwater stream to increase the pH to a pH of at least about 9 to prevent precipitation of impurities from the liquid phase portion.

Receiving the feedwater inlet stream may involve receiving a feedwater inlet stream having at least one of a total alkalinity of at least about 200 mg/l (milligrams per liter), a total suspended solids concentration of at least about 2 mg/l, a total dissolved solids concentration of at least about 500 mg/l, a silicate concentration of at least about 10 mg/l, and a hardness of at least about 0.1 mg/l.

Receiving the feedwater inlet stream may involve receiving a feedwater inlet stream having at least a portion thereof that is recovered during an in situ thermal flood recovery operation.

The bore may include a substantially un-contoured bore.

The bore may include a generally smooth bore surface.

Delivering the heat flux may involve generating heat and directing the generated heat to the metal wall of the tubing circuit.

Generating the heat may involve generating a radiant heat flux within a chamber, the tubing circuit having at least a first portion disposed in the chamber and the method may further involve causing a convective heat transfer between the chamber and a second portion of the tubing circuit disposed outside the chamber.

Receiving the feedwater inlet stream may involve receiving the feedwater inlet stream at the second portion of the tubing circuit and the outlet stream may be discharged from an outlet of the first portion of the tubing circuit.

Generating heat may involve converting a primary fuel source to provide energy and receiving a heated gaseous flow discharged during the converting.

The tubing circuit may include an economizer section for heating the feedwater within the tubing circuit and an evaporator section for causing evaporation of the feedwater stream to generate the outlet stream, and receiving the heated gas flow may involve receiving the heated gas flow at the evaporator section and directing the heated gas flow to the economizer section.

At least a portion of the tubing circuit may include a metal wall having a bore material selected to withstand operating stresses due to a pressure associated with the feedwater stream at elevated wall temperatures caused by delivery of the heat flux to the feedwater stream.

The portion of the tubing circuit may include tubing that complies with ASTM A 335 P22 specification.

Delivering the heat flux may involve delivering an average heat flux of between about 10,000 BTU/hr/ft$^2$ and about 25,000 BTU/hr/ft$^2$.

The method may involve determining a steam quality associated with the outlet stream involving receiving signals for determining a mass flow rate of the feedwater inlet stream, determining a density of saturated vapor in the outlet stream, determining a density of saturated liquid in the outlet stream, receiving signals for determining a mass flow rate of steam vapor in the outlet stream, determining the steam quality from the density of saturated vapor, the density of saturated liquid, the mass flow rate of the feedwater inlet stream, and the mass flow rate of the dry steam vapor in the outlet stream.

Receiving the signals for determining the mass flow rate of the feedwater inlet stream may involve receiving signals representing a pressure and a temperature associated with the feedwater inlet stream and determining a density of the feedwater inlet stream, receiving a signal representing a pressure difference across an inlet flow nozzle and using the pressure difference to determine a volumetric flow rate of the feedwater inlet stream, and determining the mass flow rate of the feedwater inlet stream using the volumetric flow rate and the density of the feedwater inlet stream.

Receiving the signals for determining the mass flow rate of the feedwater inlet stream may involve receiving a signal representing the mass flow rate of the feedwater inlet stream.

Receiving signals for determining a mass flow rate of steam vapor in the outlet stream may involve receiving signals representing a pressure and a temperature associated with the outlet stream and determining a density of the outlet stream, receiving a signal representing a pressure difference across an outlet flow nozzle and using the pressure difference to determine a volumetric flow rate of the outlet stream, and determining the mass flow rate of the outlet stream using the volumetric flow rate and the density of the feedwater inlet stream.

Determining the mass flow rate of the outlet stream may involve determining the mass flow rate of the outlet stream on the basis of dry steam flowing through the outlet flow nozzle.

Determining the steam quality may further involve applying a correction to the determined steam quality to generate steam quality values that are in agreement with steam quality values determined by other methods.

Receiving the signals for determining the mass flow rate of the outlet stream may involve receiving a signal representing the mass flow rate of the outlet stream. Receiving the feedwater inlet stream may involve receiving a feedwater inlet stream at a once-through steam generator operable to provide steam for an in situ thermal flood hydrocarbon recovery operation.

Receiving the feedwater inlet stream at the once-through steam generator may involve receiving the feedwater inlet stream at one of a single pass once-through steam generator, and a multiple pass once-through steam generator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
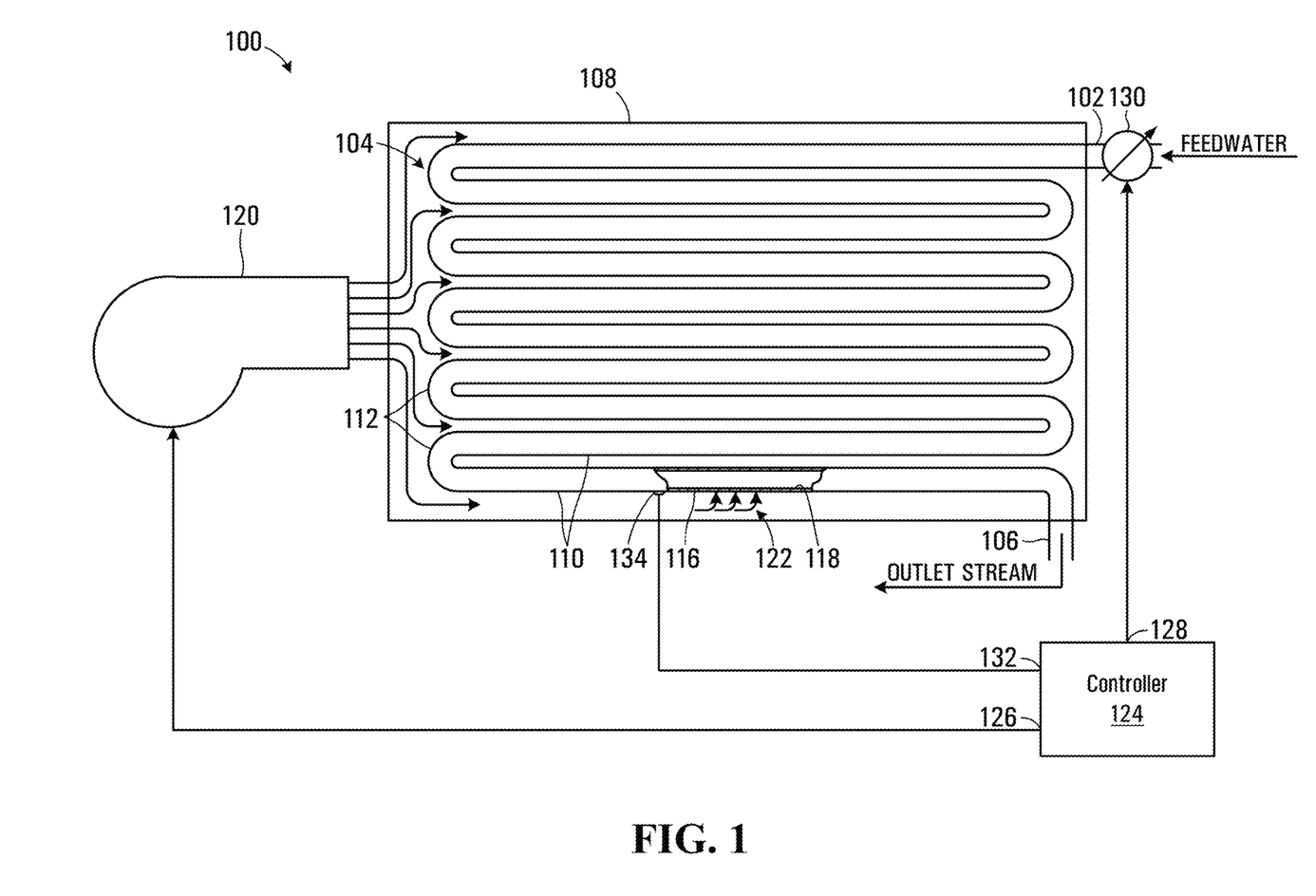
FIG. 1 is a schematic view of a steam generator apparatus in accordance with a first embodiment of the invention.

Referring to FIG. 1, a steam generator apparatus is shown generally at 100. The apparatus 100 includes an inlet 102 for receiving a feedwater inlet stream including impurities. In one embodiment, the feedwater inlet stream comprises a substantial portion of brackish ground water having a high salinity and may further include water that is recovered during hydrocarbon recovery and processing operations such as an in situ thermal flood recovery operation (for example SAGD operations). As such the feedwater inlet stream may include impurities in the form of iron, silicate, calcium, magnesium, carbonates, and other dissolved and suspended solids.

In one example embodiment the feedwater inlet stream may have a total suspended solids (TSS), total oil & grease (TOG), total organic carbon (TOC), total dissolved solids (TDS), silicate (Si), total alkalinity (Alk), and total hardness (calcium carbonate) content, each of which may fall within a certain range typical of the hydrocarbon recovery industry. For example the feedwater stream may have one or more properties such as, a total alkalinity (e.g., M-Alk) of at least about 200 mg/l (e.g., measured using methyl orange as a pH indicator), a total suspended solids concentration of at least about 2 mg/l, a total dissolved solids concentration of at least about 500 mg/l, a silicate concentration of at least about 10 mg/l, and a hardness of at least about 0.1 mg/l. In other embodiments, different impurities may be present in the feedwater stream.

The steam generator 100 also includes a tubing circuit 104 in communication with the inlet 102. The tubing circuit 104 is housed within a chamber 108 and in this embodiment the tubing circuit 104 comprises plurality of tubing sections 110 coupled together by tubing bends 112 to provide a folded tubing circuit extending through the chamber to an outlet 106. In other embodiments, the tubing circuit 104 may include more than one tubing circuit extending between the inlet 102 and outlet 106 for providing a greater steam generating capacity. Commonly in embodiments where the tubing circuit 104 includes multiple parallel tubing circuits, the tubing circuits may be housed in a common chamber and a single heat source, such as the heat source 120 may deliver the heat flux to each of the tubing circuits. The tubing sections 110 and tubing bends 112 have metal walls 116 that define a substantially un-rifled bore 118 for carrying the feedwater stream through the steam generator 100. The tubing circuit 104 is in thermal communication with a heat source 120 that delivers a heat flux 122 to the feedwater stream through the metal wall 116 of the tubing circuit to generate steam by causing evaporation of feedwater within the tubing circuit. Un-rifled tubing is usually supplied as seamless steel tubing generally having an un-contoured bore, which may have some surface roughness introduced during fabrication, but may otherwise be described as having a smooth bore.

Rifled bore tubing operates in a generally similar manner to the rifling in gun barrels in that the grooves have a twist that imparts a spin to the fluids passing though the tubing. Ribs or other contours may produce similar effects to rifling grooves. As noted above, the use of rifled bore tubing has been suggested for steam generation from feedwater including impurities and particularly for generation of high steam quality from such a feedwater. However incorporation of rifled tubing in the tubing circuit 104 is associated with substantial additional cost. Importantly, the inventors have discovered that the use of rifled or ribbed tubing is not required for cooling the tubing circuit 104 and for reducing precipitation of impurities on the metal walls 116 of the tubing circuit. From the standpoint of tube cooling, which is commonly believed to require wall wetting by a liquid portion of the feedwater stream, the inventors have discovered that multi-phase fluid and not just the liquid phase portion will help cool the tube even at high steam qualities, and accordingly, saturated steam itself can act as a cooling fluid, for example, when the tube temperature exceeds the temperature of the steam. Accordingly, it is the steam and water mixture which absorbs and transports the heat from the tube wall and not just the water (liquid phase) portion as was previously believed.

In the embodiment shown, the steam generator 100 also includes a controller 124 for controlling operation of the steam generator. The controller 124 includes an output 126 for producing a control signal for controlling a firing rate of the heat source 120, thereby controlling the heat flux 122 delivered to the feedwater stream. The controller 124 also includes an output 128 in communication with a flow controller 130 for controlling a flow rate of the feedwater inlet stream received at the inlet 102. The flow controller 130 may control flow by controlling a pump rate of a pump (not shown) in communication with a storage tank holding feedwater, for example.

In one embodiment, the controller 124 is configured to control at least one of a flow rate of the feedwater stream and the heat flux 122 to cause generation of an outlet stream at the outlet 106 that includes a steam portion and liquid phase portion such that the liquid phase portion is less than about 20% of the outlet stream by mass. Increasing the heat flux 122 by increasing a firing rate of the heat source 120 has a generally similar effect to reducing the flow rate of the feedwater inlet stream, which both have the effect of reducing the proportion of the liquid phase portion that remains in the outlet stream. The controller 124 thus causes the steam generator 100 to generate an outlet stream having a steam quality of greater than 80%. Advantageously, a substantial portion of the impurities present in the feedwater stream received at the inlet 102 are entrained in the liquid phase portion of the outlet stream and are discharged as part of the outlet stream at the outlet 106. This has the advantage of reducing scaling of the bore 118 of the tubing circuit 104.

The inventors have discovered that even when the steam quality at the outlet exceeds 90%, the temperature rise in the metal walls 116 of the tubing circuit 104 is modest and generally remains below a threshold temperature $T_t$ associated with safe operation of the steam generator 100. For example, for a typical ASTM SA106B/C high pressure seamless steel tube the carbonization temperature limit is about 427° C., above which carbonization of the tube walls may occur leading to a reduction of the wall stresses that the tube can withstand. Accordingly, operating above this carbonization temperature limit would lead to a greater likelihood of failure of the tubing circuit 104. The applicable threshold temperature may thus be a temperature that is lower than the carbonization temperature limit for the tubing circuit 104, to provide an operating margin. In another embodiment the tubing circuit 104 may include tubing that complies with ASTM A 335 P22 specification, which is able to withstand high operating stress at temperatures of up to about 454° C. before allowable stresses begin to reduce with increasing temperatures above 454° C.

In the embodiment shown in FIG. 1, the controller 124 includes thermocouple inputs 132 for receiving signals from one or more thermocouples 134 disposed to monitor the temperature of the metal wall 116. Accordingly, the controller 124 may be configured to reduce either the firing rate of the heat source 120 or to increase the feedwater flow rate if the threshold temperature is exceeded during operation of the steam generator 100. Alternatively, under manual operation of the controller 124, an alarm signal may be generated by the controller to provide a warning to personnel operating the steam generator 100 of an unsafe operating condition.

Figure 2:
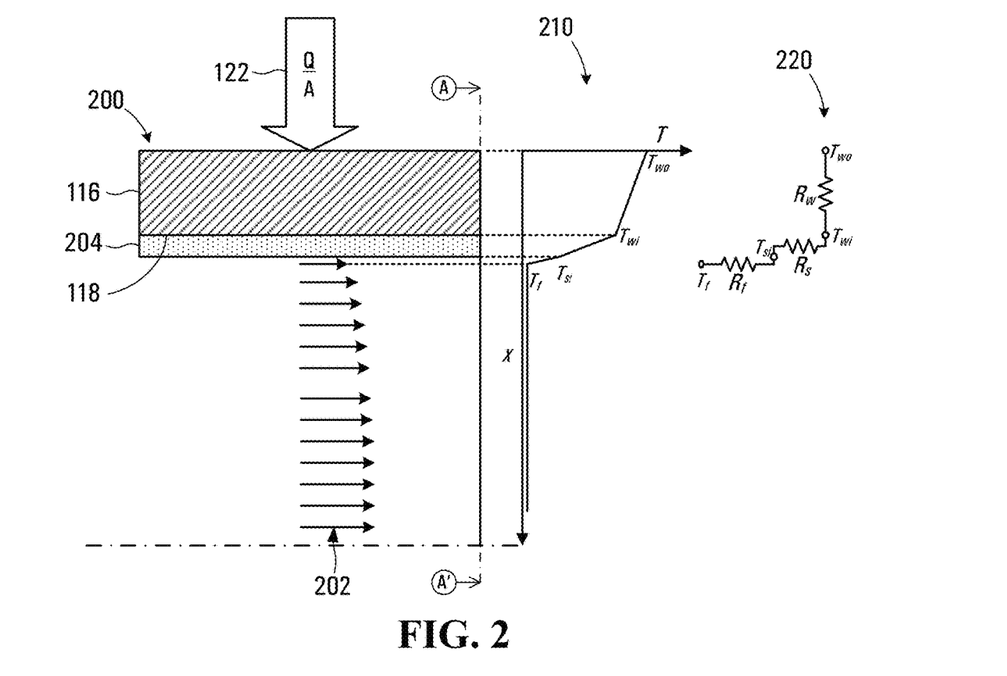
FIG. 2 is a schematic view of a portion of a metal wall of a tubing circuit used in the steam generator apparatus shown in FIG. 1.

The conditions at the walls 116 of the tubing circuit 104 that permit generation of an elevated steam quality outlet stream at the outlet 106 are described further with reference to FIG. 2. Referring to FIG. 2, a portion 200 of the metal wall 116 of the tubing circuit 104 is shown schematically at 200 along with the heat flux 122 that is incident on the wall portion. In this example, the stream flowing through the tubing portion 200 is indicated by arrows 202 and is assumed to be dry, and thus has no liquid portion. The length of the arrows 202 generally indicate the flow velocity profile of steam through the tubing portion 200. The dry steam case represents a generally expected worst case for heat transfer between the wall portion 200 and the feedwater stream, since the wetting of the bore 118 by feedwater that remains in the liquid phase is commonly believed to be essential to cooling the wall 116 to prevent failure due to excessive wall temperatures. Such excessive temperatures were generally expected when attempting to operate a steam generator at high steam quality. For this reason, prior art steam generators that have smooth bore tubing circuits are commonly operated to generate steam having a quality of less than 80% to provide for sufficient wall wetting.

In this example the bore 118 is shown having a layer of scale 204 that has accumulated on the bore. The constitution of the scale layer 204 depends on the actual impurities and combinations of impurities in the feedwater inlet stream and may also generally vary in thickness and constitution along the tubing circuit 104, with some portions of the tubing circuit being more susceptible to scale accumulation due to the conditions to which these specific tubing portions are subjected.

A temperature profile associated with the wall portion 200 is shown graphically at 210 and represents temperature values T taken at various locations x through the wall taken along the cross section line A-A'. Equivalent thermal resistances associated with the heat flux 122 in flowing through the wall portion 200 are shown at 220.

The highest temperature $T_{wo}$ is the outside wall temperature (in this example the effect of outside wall fouling has been omitted) and the wall 116 may be represented as a thermal resistance $R_w$. The inside wall temperature $T_{wi}$ at the bore 118 is thus lower than the temperature $T_{wo}$ due to the resistance $R_w$ of the metal wall 116. The effect of the scale layer 204 is to add thermal resistance $R_s$ which further lowers the temperature $T_{si}$ at the inside portion of the scale layer in communication with the feedwater stream 202. The scale layer 204, if present, would thus have the effect of increasing the required outside wall temperature $T_{wo}$ for a desired steam quality level and may increase $T_{wo}$ beyond the temperature threshold $T_t$ as described above.

A final resistance to the heat flux is the internal convective heat transfer coefficient between the scale layer 204 and the feedwater, which is represented by a resistance $R_f$ in FIG. 2. The resistance $R_t$ results in a temperature $T_f$ at the periphery of the stream 202. Generation of steam at a desired steam quality level above 80% may thus be associated with generating a specific temperature $T_f$ at the stream periphery, thus setting a required outside wall temperature $T_{wo}$.

The effect of the resistance $R_s$ due to the scale layer 204 is thus an important factor in safe operation of a steam generator 100 in an operating range such that the outside wall temperature $T_{wo}$ remains below the threshold temperature $T_t$. The actual thermal resistance $R_s$ for any particular scale layer 204 is difficult to predict and generally depends on the thickness of the layer, the constituents of the scaling materials, and the porosity of the scale accumulation, for example.

It is widely held that scale accumulation is significantly accelerated at high steam quality, since impurities are concentrated in any remaining liquid phase portion of the stream and it is believed that such impurities precipitate out onto the wall surfaces. While steam generation using carefully treated feedwater may avoid such scale accumulation due to elimination of impurities, in practice elimination of impurities is impractical and costly. Steam generation using feedwater having significant levels of impurity is more common, particularly in hydrocarbon recovery operations where regulations require use of brackish water and recycled water and limit fresh water use.

Scale accumulation has been thus far believed to be a limiting factor in production of high quality steam in a steam generator, unless costly measures to avoid scaling and/or reduce wall temperature are implemented (see for example Berruti US Patent publication 2011/0017449).

In contrast, the inventors have established that no such significant acceleration of scale accumulation occurs at steam qualities higher than 80%, and that ribbed or rifled tubing is not required for operation of the steam generator 100 to produce elevated steam qualities above 80% and more particularly 90% and beyond. Importantly, the incorporation of rifled tubing in the tubing circuit 104 would represent a significant added cost to the steam generator 100 and such rifling may also present an impediment to "pigging" of the tubing circuit, in which a tool is launched through the tubing circuit to clear potential blockages. In the embodiments disclosed herein rifled or ribbed tubing is not required to provide for contaminant concentration in the liquid phase portion of the stream.

Furthermore, in contrast to another widely held view that wetting of the bore 118 of the tubing circuit 104 by the liquid portion is essential (see for example Berruti referenced above), the inventors have established that even under conditions where portions of the bore 118 of the steam generator 100 are dry or substantially dry (i.e. steam quality at or approaching 100%), the threshold wall temperature $T_t$ would generally not be exceeded simply by operating the steam generator 100 at such elevated steam quality levels. The inventors have established that operating the steam generator 100 at elevated steam quality levels at worst results in a moderate increase in outside wall temperature $T_{wo}$ of a few degrees, which generally remains well within the threshold temperature $T_t$ over an operating period of interest. Such an operating period may be defined in terms of a periodic maintenance schedule, for example and may extend over months or even years.

Figure 3:
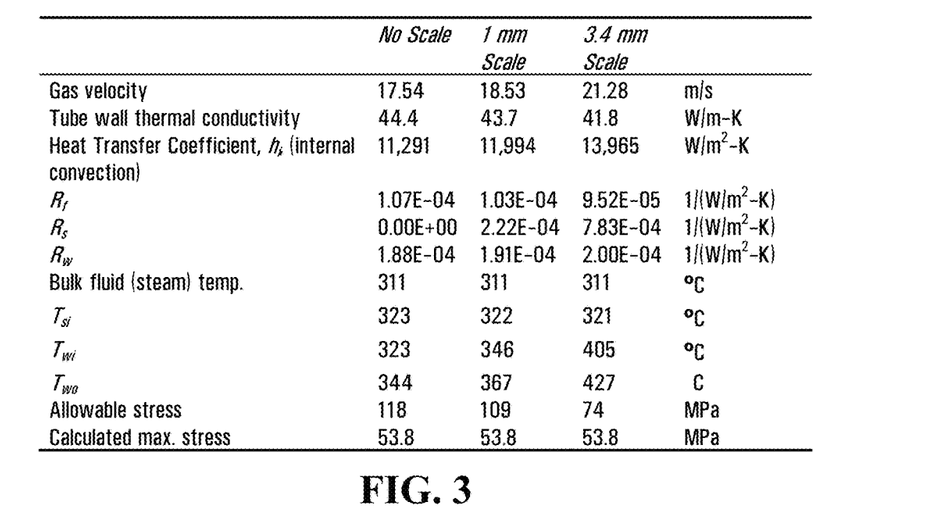
FIG. 3 is a table of calculated parameter values associated with operation of a steam generator in accordance with an embodiment of the invention.

Referring to FIG. 3, a table comparing calculated wall temperature values for operation of a 50 MMBtu/hr, 2 pass once-through steam generator (OTSG) operating under dry steam generating conditions is shown. The OTSG example used in the calculations was designed by ITS Engineered Systems of Katy Tex., USA and manufactured by Universal Industries of Lloydminster, Alberta, Canada having 3 inch NPS radiant tubes (3.5 inch O.D., 2.9 inch I.D.) and a boiler feed water (BFW) flow rate of 716 tonne/day (358 tonne/day per pass). The calculated values show that the wall temperature $T_{wo}$ remains well within the carbonization limit of 427° C. and allowable tube wall stresses remain well below the calculated maximum stress under both the no scaling (0 mm scale) and light scaling conditions (1 mm scale). However, under heavier scaling conditions of about 3.4 mm the wall temperature $T_{wo}$ reaches the carbonization limit of 427° C. for the particular tubing materials in the steam generator. The inventors have established that scale accumulation when operating such a steam generator at high steam qualities of about 90% or more is generally slow in comparison to the operating period of interest. In some cases, regulations make it necessary to perform periodic pressure safety testing, and in such cases the operating period of interest may be selected to coincide with the pressure safety testing period. At the time of the pressure safety testing, measures such as pigging of the tubing circuit can be taken to remove at least a portion of accumulated scale. In some embodiments, such an operating period may be about a year.

Steam Generating System

Figure 4:
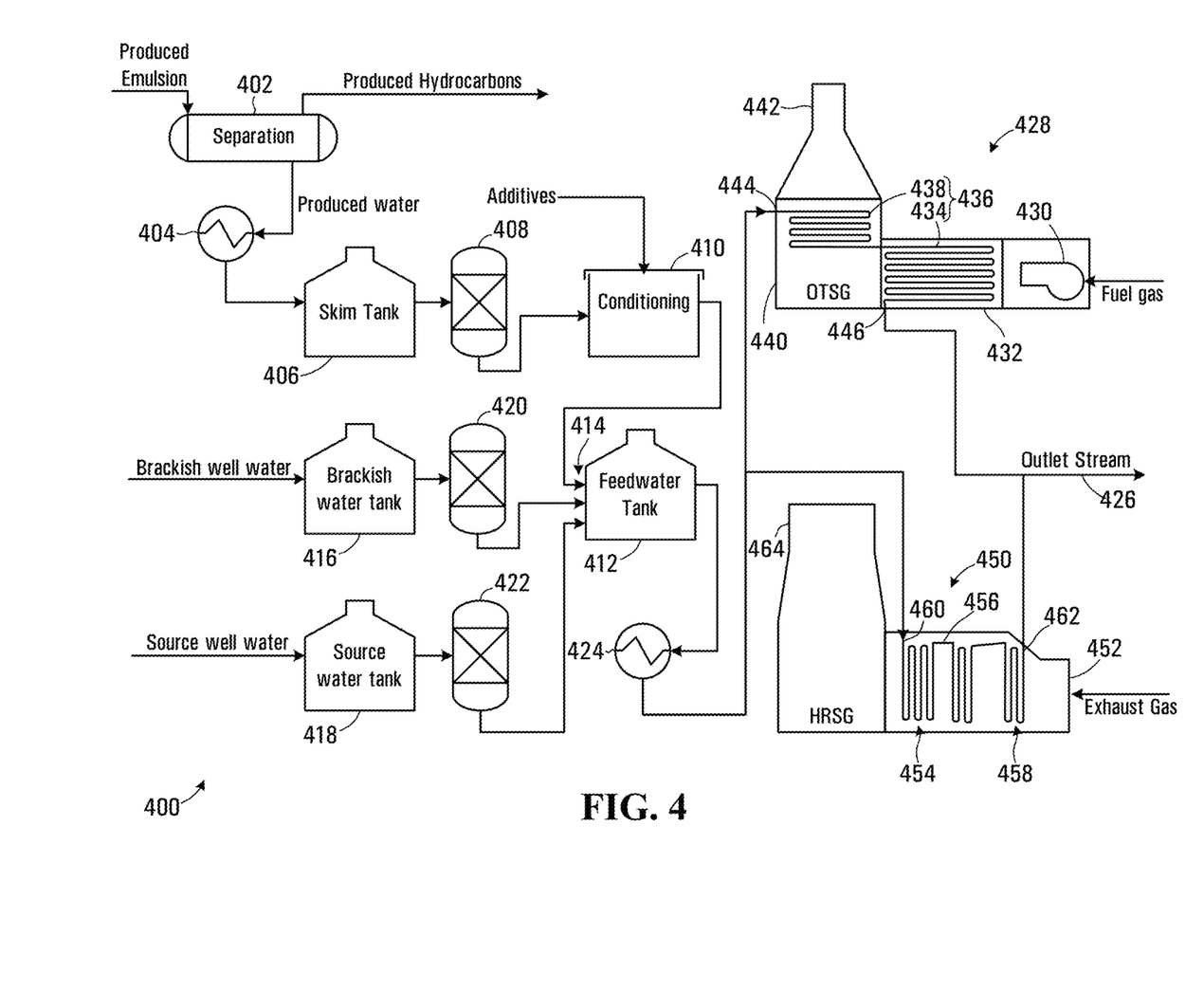
FIG. 4 is a schematic diagram of a steam generating system for use in an in situ thermal flood hydrocarbon recovery operation.

A simplified steam generating system embodiment for use in a SAGD in situ hydrocarbon thermal recovery operation is shown in schematic view in FIG. 4 at 400. In FIG. 4, components not directly related to steam generation have been omitted for sake of clarity and it should be appreciated that a SAGD system would include further processing stages in addition to those shown in FIG. 4.

Referring to FIG. 4, a produced emulsion stream from a SAGD well is received at an inlet of a separator 402. The separator 402 separates the emulsion stream into a hydrocarbon product stream and a produced water stream. The hydrocarbon product stream would generally include gaseous and liquid hydrocarbon product streams and, as such the separator 402 would generally include several stages for separating the emulsion into these various product streams. The produced water stream may include residual hydrocarbon and other impurities such as calcium, magnesium, silicate, iron, and/or other heavy metals and is typically at elevated temperature. The produced water is received at an inlet of a heat exchanger 404, which recovers heat from the produced water and produces a partially cooled produced water stream at an outlet. In one embodiment, the emulsion temperature is about 170° C. to 180° C. and the produced water stream is cooled to about 90° C.

The cooled produced water stream from the heat exchanger 404 is received at an inlet of a skim tank 406. The skim tank 406 provides a sufficient volume to permit a residence time in the skim tank that facilitates further cooling of the produced water to meet pipeline temperature specifications. The skim tank 406 may also facilitate separation of some of the residual hydrocarbons by skimming. The skim tank 406 may also have an inlet for receiving other water streams, such as may be recovered during further processing of the produced hydrocarbon stream by the separator 402 for example.

The skim tank 406 includes an outlet for drawing off the produced water stream, which is then directed to an inlet of a filter 408. The filter 408 may include an induced static flotation filtration stage and an oil removal filtration stage, for example. The filter 408 produces a filtered produced water stream at an outlet, which is then transported to an inlet of a conditioning tank 410.

In one embodiment the conditioning tank 410 may be a warm lime softening tank that facilitates removal of constituents such as calcium, magnesium, and silicate to reduce the hardness of the produced water stream while the water stream is still at elevated temperature (i.e. at about 50° C. to 60° C.). In this embodiment the conditioning tank 410 includes an additive inlet for facilitating introduction of additives. In general additives to be introduced into the produced water may be selected on the basis of the constitution of the produced water stream, and may include lime, magnesium oxide, and polymers, for example.

For some in situ thermal flood recovery operations, a pH of the feedwater stream will generally be between 8 and 10. In embodiments, where the produced water has a low pH, conditioning may involve increasing the pH of the produced water. For example, if the produced water has a pH of less than 9, the produced water in the conditioning tank 410 may be conditioned to increase the pH to a pH of at least about 9 to prevent precipitation of impurities from the liquid phase portion during steam generation.

A conditioned produced water stream is drawn off from an outlet of the conditioning tank 410, and transported to a feedwater tank 412, which has inlets 414 for receiving various water streams that make up the feedwater stream for the generation of steam. In the embodiment shown in FIG. 2, the feedwater stream for generation of steam is made up of recovered produced water, brackish water from a well, and other source water, which may be provided from a well or other source, for example. Accordingly, in this embodiment the system 400 includes a brackish water tank 416 for receiving brackish well water and a source water tank 418 for receiving source water. The brackish water steam and source water stream are drawn off from the respective tanks 416 and 418 and passed through associated filters 420 and 422. The filters 420 and 422 may include one or more primary and polishing filtration stages, such as ion exchange filtering, for example. The filtered brackish water and source water may be further conditioned as necessary and the streams are received at the inlets 414 of the feedwater tank 412. The feedwater stream from the feedwater tank 412 is directed through a heater 424 to provide a feedwater inlet stream in an appropriate temperature range for generation of steam. In one embodiment the heater 424 heats the feedwater stream to about 170° C.

In the embodiment shown in FIG. 4, the system 400 includes two steam generators that run in parallel to produce an outlet stream 426. A first steam generator 428 is configured as a once-through steam generator (OTSG) and includes a burner 430 for generating heat from a fuel gas. The heat generated by the burner 430 is received in a first chamber 432. The first chamber 432 houses a first portion 434 (commonly referred to as a radiant section) of a tubing circuit 436 and is configured to cause a radiant heat flux within the chamber, which is delivered to the first portion 434 of the tubing circuit 436. The OTSG 428 also includes a second chamber 440, which houses a second portion 438 of the tubing circuit 436 (commonly referred to as a convection section). The second chamber 440 is in communication with the first chamber 432 to receive a convective transfer of heat from the first chamber for heating the second portion 438 of the tubing circuit 436. The second chamber 440 includes a stack 442 for exhausting hot gasses that pass over the second portion 438 of the tubing circuit 436. The feedwater inlet stream is received from the heater 424 at an inlet 444 and passes through the second portion 438 of the tubing circuit 436, where the feedwater is heated by convective heat transfer to cause evaporation of the liquid feedwater to generate steam. The feedwater stream is then directed through the first portion 434 of the tubing circuit, where the radiant heat transfer to the feedwater stream is substantially greater than in the convective second chamber 440. In general, the steam quality or dryness increases progressively along the tubing circuit 436 and reaches maximum steam quality proximate an outlet 446, where the outlet stream of high steam quality is available for use in SAGD operations. As noted above, SAGD operations generally require injection of dry steam having a steam quality of substantially 100% and accordingly if the steam quality of the outlet stream is less than 100%, the outlet stream would commonly be passed through steam separator for separating the liquid phase portion from the steam portion to increase the steam quality to substantially 100%. In embodiments where the steam generators 428 and 440 generate substantially 100% steam quality at the outlets 446 and 462, no further processing of the outlet stream would be required. In other thermal flood operations such as cyclic steam stimulation hydrocarbon recovery operations, a steam quality of less than 100% may be sufficient.

A second steam generator 450 is configured as a heat recovery steam generator (HRSG) and includes an inlet 452 for receiving a heated gaseous flow discharged as an exhaust gas produced through conversion of a primary fuel source to provide energy for other processes, such as generation of electricity for example. The HRSG 450 includes an economizer section 454 for heating the feedwater in a tubing circuit 456 and an evaporator section 458 for causing evaporation of the feedwater stream to generate an outlet stream of high steam quality. In other embodiments, the second steam generator may be otherwise configured to the steam generator 450 shown in FIG. 4 and may include other sections, including for example more than one economizer section and/or more than one evaporator section. The heated gas flow received at the inlet 452 is received at the evaporator section 458, directed to the economizer section 454, and is exhausted from the HSRG 450 through a stack 464. The feedwater inlet stream is received at an inlet 460 of the economizer section 454 and directed though the tubing circuit 456 to the evaporator section 458. The outlet stream is produced at an outlet 462 and combined with the outlet stream produced by the OTSG 428. In general, SAGD operations may require several steam generators such as the OTSG 428 and HRSG 450 shown in FIG. 4 to generate adequate volumes of steam for hydrocarbon recovery operations.

The tubing circuit 436 of the OTSG 428 and the tubing circuit 456 of the HSRG 450 may be configured and operated generally as described above in connection with the embodiment shown in FIG. 1 to generate an outlet stream having a steam quality of greater than 80%. As such, the tubing circuits 436 and 456 comprise tubing having a substantially smooth un-rifled bore as described above. Advantageously, the feedwater inlet stream provided at the inlets 444 and 460 include a large proportion of brackish water and recycled produced water, which reduces the amount of make-up source water required for ongoing steam generation. Furthermore advanced conditioning and treatment of the feedwater inlet streams is not required, since the impurities present in the feedwater inlet stream are entrained in the liquid phase portion and are discharged as part of the outlet stream.

Advantageously, generating high quality steam in the OTSG 428 or HRSG 450 has one or more of the following advantages of reducing feedwater treating costs, generating less disposal water, lowering $CO_2$ emissions, improving water recycle ratio, and lowering required make up water.

Steam Quality Measurement

When operating a steam generator such as the steam generator 428 shown in FIG. 4 at high steam qualities of above 80%, it may be useful to have a relatively precise determination of the actual steam quality being produced by the generator to facilitate control of the process and the resulting steam quality. Indirect quality measurement methods that employ conductivity or other measurement of an outlet stream sample from time to time may not provide sufficient information to achieve sufficiently precise control of the steam generator to generate an outlet stream having high steam quality.

Figure 5:
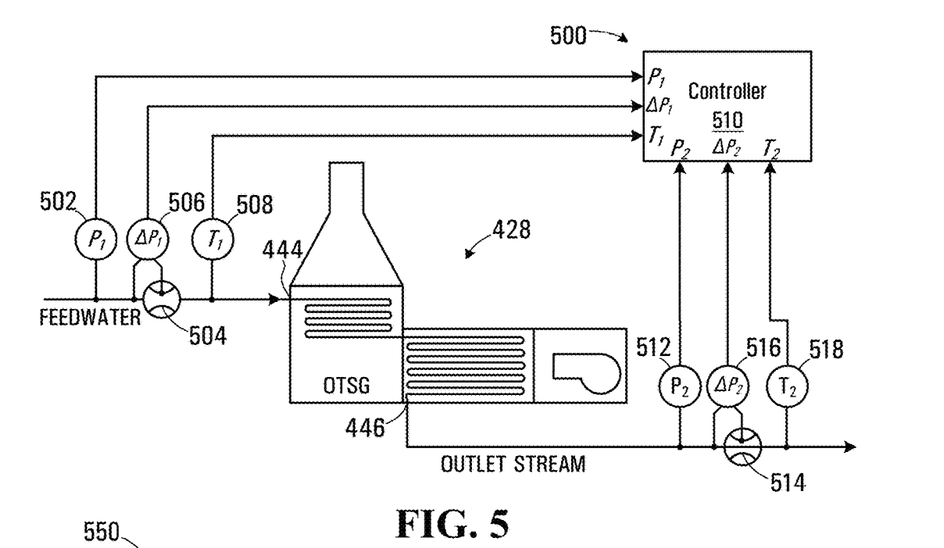
FIG. 5 is a schematic diagram of an online steam quality measuring system in accordance with one embodiment of the invention.

Referring to FIG. 5, an online steam quality measuring system in accordance with one embodiment of the invention is shown generally at 500. The measuring system 500 is described in connection with the OTSG 428 shown in FIG. 4, but may equally well be implemented in the HRSG 440 or the steam generator 100 shown in FIG. 1. The measuring system 500 includes a pressure sensor 502 for measuring the feedwater pressure $P_1$ at the inlet 444 of the OTSG steam generator 428, an inlet flow nozzle or orifice plate 504 and associated differential pressure sensor 506 for measuring the pressure drop $\Delta P_1$ across the nozzle, and a temperature sensor 508 for measuring the temperature $T_1$ of the feedwater inlet stream at the inlet 444. The sensors 502, 506, and 508 are each in communication with a controller 510, which may comprise a processor circuit for performing calculations in response to receiving the $P_1$, $\Delta P_1$, and $T_1$ values provided by the respective sensors.

The measuring system 500 also includes a pressure sensor 512 for measuring the feedwater pressure $P_2$ at the outlet 446 of the OTSG steam generator 428, an outlet flow nozzle or orifice plate 514 and associated differential pressure sensor 516 for measuring the pressure drop $\Delta P_2$ across the nozzle, and a temperature sensor 518 for measuring the temperature $T_2$ of the outlet stream at the outlet 446. The sensors 512, 516, and 518 are also each in communication with the controller 510.

Figure 7:
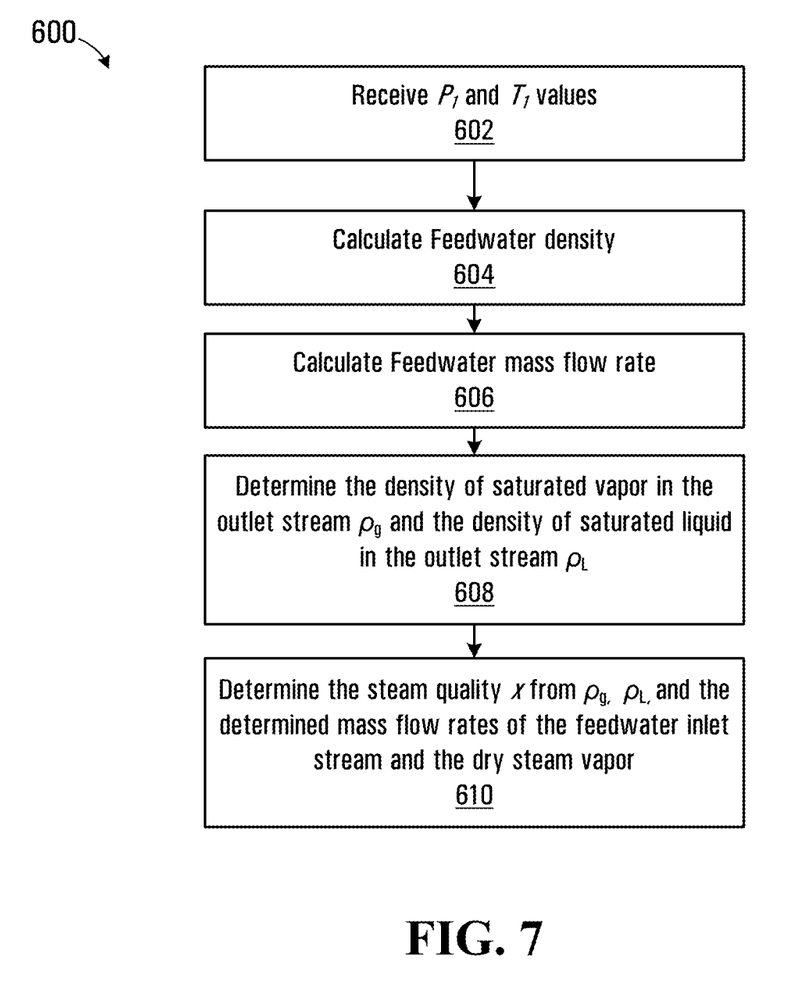
FIG. 7 is a block diagram of a process for determining steam quality implemented by the system shown in FIG. 5.

Referring to FIG. 7, a process for determining steam quality implemented on the system 500 is shown generally at 600. The process begins at block 602 where the pressure $P_1$ and temperature $T_1$ of the feedwater stream is received by the controller 510 from the respective sensors 502 and 508. At block 604, the feedwater density $\rho_1$ is determined and is typically determined as a function of the feedwater temperature and pressure. In some embodiments the salinity of the feedwater may also be taken into account in determining the feedwater density. As an example, the density of the feedwater may be determined from steam tables, tabulations or other correlations.

At block 606, the feedwater mass flow rate is determined. The feedwater inlet stream is a single phase liquid stream having a mass flow rate in $\dot{m}_{FW}$, which for a nozzle such as the nozzle 514 may be written as:

$$\dot{m}_{FW} = k_1\sqrt{\rho_1\Delta_1};  \qquad \text{Eqn 1}$$

where $k_1$ is a constant associated with the inlet flow nozzle for the liquid feedwater stream. In general $k_1$ is dependent on a constitution of the fluid flowing through the nozzle and may be given by:

$$k_1 = C \cdot A \cdot Y\sqrt{2}. \qquad \text{Eqn 2}$$

In Eqn 2, C is the flow coefficient, A is the area of the nozzle 504, and Y is the compressibility factor. In other embodiments, an alternative flow meter such as a coriolis flow meter, which provides mass flow rate and density of a fluid flowing through the tube, may be used to determine the mass flow rate of the feedwater.

Through conservation of mass, the mass flow rate of the feedwater $\dot{m}_{FW}$ at the inlet 444 and the mass flow rate of the outlet stream $\dot{m}_{OS}$ at the outlet 446 should be equivalent, i.e.:

$$\dot{m}_{OS} = \dot{m}_{FW} = k_2\sqrt{\rho_m\Delta P_2}; \qquad \text{Eqn 3}$$

where $k_2$ is a constant for the outlet flow nozzle 514 and is associated with the constitution of the outlet stream, which includes liquid and vapor phase portions, and $\rho_m$ is the effective density of the mixture of liquid and vapor phases. Again, in other embodiments, an alternative flow meter such as a coriolis flow meter may be used to provide the flow rate.

Eqn 3 may be rewritten as:

$$\rho_m = \frac{\dot{m}_{FW}}{k_2^2\Delta P_2}. \qquad \text{Eqn 4}$$

The density $\rho_m$ of the mixture of liquid and vapor phases is a function of steam quality x and depends on the flow regimen, which for high steam quality may be assumed to be an annular mist flow. Assuming homogenous flow and no slip (i.e. different flow velocities) between the vapor and liquid phases in the outlet stream:

$$\frac{1}{\rho_m} = \frac{x}{\rho_g} + \frac{1-x}{\rho_L}; \qquad \text{Eqn 5}$$

where $\rho_g$ is the density of saturated vapor in the outlet stream, and $\rho_L$ is the density of saturated liquid in the outlet stream, which may be determined from a correlation or from steam tables. At block 608 of the process 600 estimates for $\rho_g$ and $\rho_L$ are produced from correlations or from steam tables. For example, $\rho_g$ and $\rho_L$ are both functions of pressure and may be determined by steam tables, tabulations or other correlations.

Substituting the expression for $\rho_m$ from Eqn 4 in Eqn 5 yields:

$$x = \left[ \frac{\left[\frac{\dot{m}^*_{st}}{\dot{m}_{FW}}\right]^2 - \frac{\rho_g}{\rho_L}}{1 - \frac{\rho_g}{\rho_L}} \right] C_f; \quad \text{Eqn 6}$$

where:
x is the estimated steam quality;
$C_f$ is a correction factor; and
$\dot{m}^*_{st}$ is the mass flow rate of dry steam vapor at assumed quality of x=100% given by:

$$\dot{m}^*_{st} = k_2\sqrt{\rho_g \Delta P_2}. \quad \text{Eqn 7}$$

The correction factor $C_f$ may be used as a calibration factor for adjusting the value of x to be in agreement with steam quality measurements provided by other measurements such as a conductivity measurement, for example. In general $C_f$ would be close to unity and use of the constant $C_f$ in equation 7 may also be omitted if no independent calibration is to be performed.

At block 610, the steam quality x is determined from the values of $\rho_g$ and $\rho_L$ above and the demined mass flow rates of the feedwater inlet stream and the dry steam vapor in accordance with Eqn 6 above.

In other embodiments, where it is desirable to take the slip ratio between the liquid and gas phases into account, an alternative to Eqn 6 may be written as follows:

$$x = \left[ \frac{S\left[\frac{\dot{m}^2_{st}}{\dot{m}^2_{FW}}\right] - \frac{\rho_g}{\rho_L}}{1 - S\frac{\rho_g}{\rho_L} - \frac{\dot{m}^2_{st}}{\dot{m}^2_{FW}}(1-S)} \right] C_f; \quad \text{Eqn 8}$$

where S is the slip ratio between phases (i.e., the ratio of the velocity of the gas phase to the velocity of the liquid phase). Various correlations from published literature or empirical correlations from actual operating data can be used for the slip ratio S. However, in general, at high steam quality the slip ratio S between phases is close to unity and thus Eqn 8 and Eqn 6 should provide substantially similar results under high steam quality conditions.

Advantageously, the online steam quality measuring system 500 provides a continuously updated quality measurement that should be sufficiently precise for monitoring high steam quality levels in the output stream produced by the steam generator 428 at the outlet 446. The steam quality measuring system 500 may be similarly implemented on the HRSG 450 shown in FIG. 4.

Figure 6:
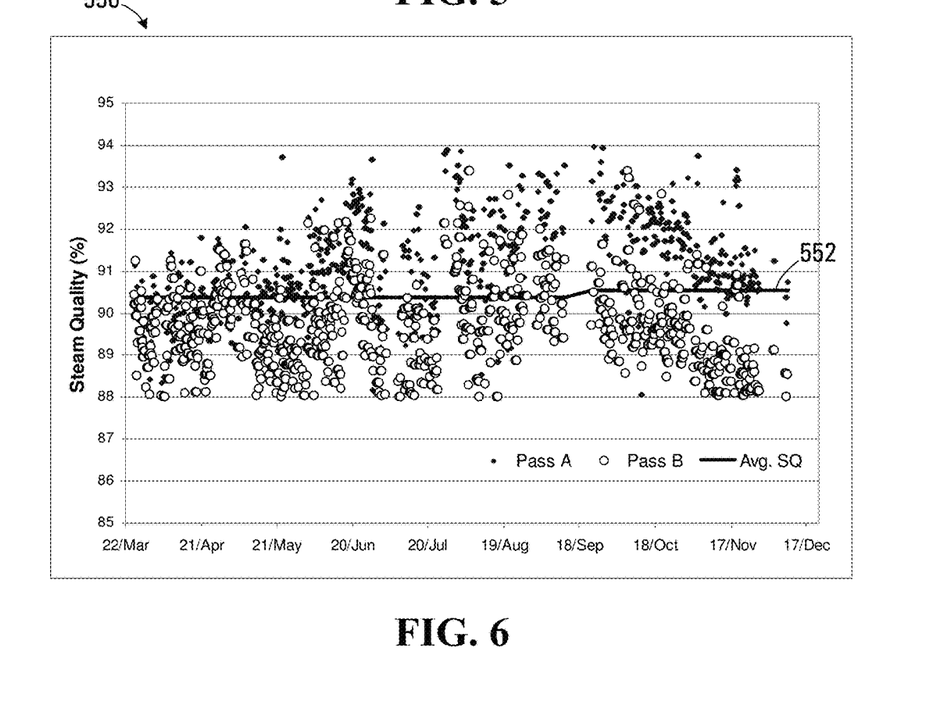
FIG. 6 is a graph depicting steam quality over a period of time generated by a steam generating system configured in accordance with embodiments of the invention.

Referring to FIG. 6, a graph of steam quality produced by a steam generating system configured in accordance with the above embodiments of the invention is shown generally at 550. The graph includes steam quality measurements taken over a period of 9 consecutive months for two parallel feed water streams, labelled as "Pass A" (diamond symbols) and "Pass B" (open circle symbols) on the graph 550. A line 552 is also shown on the graph 550 indicating an averaged steam quality for the Pass A and pass B data results. Over the time period averaged operating steam quality was about 90.4% up to the month of September and was increased to 90.6% after September. A peak steam quality of about 92% was reached. The results presented in the graph 550 demonstrate operation of the steam generating system for an extended period of time without appreciable accumulation of scale on the bore of the steam generator tubing.

Alternative Steam Quality Measurement Embodiments

Selection of the correction factor $C_f$ in Eqn 6 above may provide reasonable steam quality results in a narrow range. The correction factor may be selected to provide accurate results for a steam generation flow at a specific temperature and steam quality. For example, the correction factor may be selected to provide an accurate steam quality at an 80% steam quality level for a steam generation flow having the following characteristics: about 335000 pounds/hour and a temperature of about 310° C. For operation at 90% actual steam quality, the results provided by Eqn 6 may be in error by about 3.7% and for operation at a steam quality of 95% the error may be about 6%.

Various calculation methods that may be used to implement block 610 of the process 600 (shown in FIG. 7) are described below.

Method I

Substituting Eqn 7 in Eqn 6, and applying the correction factor only to a first term of the equation yields the following alternative steam calculation embodiment:

$$x = \frac{k_2^2 \Delta P_2}{\dot{m}^2_{FW}} \frac{\rho_g \rho_l}{\rho_l - \rho_g} C_f - \frac{\rho_g}{\rho_l - \rho_g}. \quad \text{Eqn 9}$$

For the steam generation flow example above, at 90% actual steam quality the results provided by Eqn 9 may still be in error by about 3.6% and at 95% actual steam quality the error may be about 5.8%.

Method II

In another embodiment the correction factor $C_f$ in Eqn 6 is replaced by a correction factor that is dependent on steam quality x. From Eqn 6, replacing the correction factor $C_f$ with a correction factor $(1+A(1-x))$ yields:

$$x = \left[\frac{k_2^2 \Delta P_2}{\dot{m}^2_{FW}} \frac{\rho_g \rho_l}{\rho_l - \rho_g} - \frac{\rho_g}{\rho_l - \rho_g}\right](1 + A(1-x)); \quad \text{Eqn 10}$$

where the term in square brackets in Eqn 10 is obtained by substituting Eqn 7 in Eqn 6 and simplifying. For the steam generation flow example above, at 90% actual steam quality the results provided by Eqn 10 reduce the error to about 0.06% and at 95% actual steam quality to about 0.05%.

Method III

As an alternative, a correction to the $k_2$ term may also be used in place of the correction factor $C_f$ in Eqn 9 above. An alternative steam calculation embodiment based on Eqns 6 and 7 may be expressed as follows:

$$x = \frac{[k_2 + A(1-x)]^2 \Delta P_2}{\dot{m}_{FW}^2} \frac{\rho_g \rho_l}{\rho_l - \rho_g} - \frac{\rho_g}{\rho_l - \rho_g}; \qquad \text{Eqn 11}$$

where A is an alternative correction factor and the constant $k_2$ for the outlet flow nozzle 514 is modified and is now written as a function of steam quality x. Rewriting Eqn 11 yields:

$$1 - x = 1 + \frac{\rho_g}{\rho_l - \rho_g} - \frac{\rho_g \rho_l}{\rho_l - \rho_g} \frac{\Delta P_2}{\dot{m}_{FW}^2} [k_2 + A(1-x)]^2. \qquad \text{Eqn 12}$$

From Eqn 12, writing:

$$y = 1 - x; \qquad \text{Eqn 13}$$

$$\Psi_1 = 1 + \frac{\rho_g}{\rho_l - \rho_g}; \qquad \text{Eqn 14}$$

$$\Psi_2' = \frac{\rho_g \rho_l}{\rho_l - \rho_g} \frac{\Delta P_2}{\dot{m}_{FW}^2}; \qquad \text{Eqn 15}$$

and substituting Eqns 13-15 in Eqn 12 yields:

$$y = \Psi_1 - \Psi_2' k_2^2 - 2\Psi_2' k_2 A y - \Psi_2' A^2 y^2. \qquad \text{Eqn 16}$$

Rearranging Eqn 16, and setting y=0 yields the following quadratic in y:

$$0 = \Psi_2' A^2 y^2 + (2\Psi_2' k_2 A + 1) y + \Psi_2' k_2^2 - \Psi_1; \qquad \text{Eqn 17}$$

which has roots:

$$y = \qquad \text{Eqn 18}$$

$$1 - x = \frac{-(2k_2 \Psi_2' A + 1) \pm \sqrt{(2k_2 \Psi_2' A + 1)^2 - 4\Psi_2' A^2 (\Psi_2' k_2^2 - \Psi_1)}}{2\Psi_2' A^2};$$

and thus yields the following expression for x:

$$\text{Eqn 19}$$

$$x = \frac{2\Psi_2' A^2 + 2k_2 \Psi_2' A + 1 \pm \sqrt{(2k_2 \Psi_2' A + 1)^2 - 4\Psi_2' A^2 (\Psi_2' k_2^2 - \Psi_1)}}{2\Psi_2' A^2}.$$

The correction factor A may be determined from Eqn 19 for an instantaneous set of actual operating conditions and by determining an actual co-incident steam quality by analytical methods, such as by comparing the ion content of collected condensate to the ion content of the feedwater, for example. The actual co-incident steam quality value for x, along with the set of actual operating conditions provides the necessary information for determining A from Eqn 19.

For the steam generation flow example above, at 90% actual steam quality the results provided by Eqn 19 reduce the error to about 0.005% and at 95% actual steam quality the error is reduced below 0.005%.

In an alternative embodiment, the correction factor A may be calculated for a plurality of different values of steam quality x and an approximate correction factor A may be used for a particular range of steam quality x.

In yet another embodiment the correction factor A may be expressed as a function of temperature T:

$$A = A'f(T); \qquad \text{Eqn 20}$$

For example, A may be adjusted on a linear basis to account for changes in Temperature $$\Delta A = -9.0254 \Delta T; \qquad \text{Eqn 21}$$

where $\Delta T$ is the change in temperature from a reference temperature associated with a reference set of operating points for the outlet flow nozzle or orifice plate 514 and $\Delta A$ is the resulting temperature correction to the correction factor A. Alternatively, the correction factor A may be adjusted based on a polynomial, for example:

$$\Delta A = a_1 \Delta T + a_2 \Delta T^2; \qquad \text{Eqn 22}$$

where $a_1$ is a linear coefficient (for example, −9.0254 as in Eqn 21), and $a_2$ is a coefficient for the higher order temperature correction term in $\Delta T^2$. Similar equations to Eqn 21 and Eqn 22 may also be written for providing a correction to A on the basis of pressure, or steam quality, for example.

While specific embodiments of the invention have been described and illustrated, such embodiments should be considered illustrative of the invention only and not as limiting the invention as construed in accordance with the accompanying claims.

What is claimed is:

1. A steam generator apparatus for generating steam from a feedwater inlet stream including impurities, the apparatus comprising:
    a tubing circuit in communication with an inlet for receiving the feedwater stream, the tubing circuit having an unrifled bore defined by a metal wall;
    a heat source operable to deliver a heat flux to the feedwater stream through the metal wall of the tubing circuit, the heat flux being operable to cause evaporation of feedwater within the tubing circuit and to produce an outlet stream at an outlet of the tubing circuit, the outlet stream comprising a steam portion and liquid phase portion, the steam portion being greater than about 80% of the outlet stream by mass, the steam portion providing sufficient cooling of the metal wall to maintain a wall temperature at less than a threshold temperature associated with safe operation of the steam generator apparatus; and
    a controller operably configured to control at least one of a flow rate of the feedwater stream and the heat flux to cause the outlet stream to have the steam portion greater than about 80% of the outlet stream by mass.

2. The apparatus of claim 1, wherein the tubing circuit comprises an economizer section for heating the feedwater within the tubing circuit and an evaporator section for causing evaporation of the feedwater stream to generate the outlet stream, and the heat source is disposed to deliver heat flux along at least a portion of the economizer section and at least a portion of the evaporator section.

3. The apparatus of claim 1, wherein the heat source is configured to deliver sufficient heat flux to cause a substantial portion of the impurities present in the feedwater stream to be entrained in the liquid phase portion of the outlet stream and discharged as part of the outlet stream thereby reducing scaling of the bore of the tubing circuit.

4. The apparatus of claim 1, wherein the controller is operably configured to control at least one of a flow rate of the feedwater stream and the heat flux to cause the outlet steam to have the steam portion greater than about 90% of the outlet stream by mass.

5. The apparatus of claim 1, wherein the controller is operably configured to control at least one of a flow rate of the feedwater stream and the heat flux to cause the outlet steam to have the steam portion greater than about 92% of the outlet stream by mass.

6. The apparatus of claim 1, wherein the controller is operably configured to control at least one of a flow rate of the feedwater stream and the heat flux to cause the outlet steam to have the steam portion greater than about 95% of the outlet stream by mass.

7. The apparatus of claim 1, wherein the unrifled bore of the tubing circuit comprises a substantially un-contoured wall.

8. The apparatus of claim 1, wherein the unrifled bore of the tubing circuit comprises a generally smooth wall.

9. The apparatus of claim 1, further comprising a chamber housing the tubing circuit and wherein the heat source is configured deliver heat to the chamber and the chamber is operably configured to cause heat to be directed to the metal wall of the tubing circuit for delivering the heat flux.

10. The apparatus of claim 1, further comprising a chamber housing at least a first portion of the tubing circuit, and wherein the heat source is configured to generate a radiant heat flux within the chamber and wherein a second portion of the tubing circuit is disposed outside the chamber for receiving a convective heat transfer from the chamber.

11. The apparatus of claim 1, wherein the tubing circuit comprises an economizer section for heating the feedwater within the tubing circuit and an evaporator section for causing evaporation of the feedwater stream to generate the outlet stream, and wherein the heat source produces a heated gas flow that is received at the evaporator section and directed to the economizer section.

12. The apparatus of claim 1, wherein the metal wall of at least a portion of the tubing circuit comprises a material selected to withstand operating stresses due to a pressure associated with the feedwater stream at elevated wall temperatures caused by delivery of the heat flux to the feedwater stream.

13. The apparatus of claim 12, wherein the metal wall of the portion of the tubing circuit comprises tubing that complies with ASTM A 335 P22 specification.

14. The apparatus of claim 1, further comprising an outlet flow nozzle in communication with the outlet, the flow nozzle being operable to cause a pressure drop across the nozzle to facilitate measurement of at least one of:
a steam quality associated with the outlet stream; and
a mass flow rate of steam vapor in the outlet stream.

15. The apparatus of claim 1, further comprising a controller operably configured to receive signals representing pressures and temperatures for determining at least one of:
a steam quality associated with the outlet stream;
a mass flow rate of the feedwater stream; and
a mass flow rate of steam vapor in the outlet stream.

* * * * *